(12) United States Patent
Kwon et al.

(10) Patent No.: US 10,503,353 B2
(45) Date of Patent: Dec. 10, 2019

(54) MOBILE TERMINAL AND METHOD OF CONTROLLING THE SAME

(71) Applicant: LG ELECTRONICS INC., Seoul (KR)

(72) Inventors: Yunmi Kwon, Seoul (KR); Seoyeon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 390 days.

(21) Appl. No.: 15/068,869

(22) Filed: Mar. 14, 2016

(65) Prior Publication Data

US 2017/0102855 A1    Apr. 13, 2017

(30) Foreign Application Priority Data

Oct. 12, 2015   (KR) ......................... 10-2015-0142345

(51) Int. Cl.
| | | |
|---|---|---|
| *G06F 3/0481* | (2013.01) | |
| *G06F 1/16* | (2006.01) | |
| *G06F 3/0486* | (2013.01) | |
| *G06F 3/0488* | (2013.01) | |
| *G06F 3/0484* | (2013.01) | |

(52) U.S. Cl.
CPC .......... *G06F 3/04817* (2013.01); *G06F 1/163* (2013.01); *G06F 3/0486* (2013.01); *G06F 3/0488* (2013.01); *G06F 3/04847* (2013.01); *G06F 3/04883* (2013.01); *G06F 3/04886* (2013.01); *G06F 2203/04803* (2013.01); *G06F 2203/04808* (2013.01)

(58) Field of Classification Search
None
See application file for complete search history.

(56) References Cited

U.S. PATENT DOCUMENTS 7,743,340 B2 *  6/2010  Horvitz ................ G05B 19/404
                                              715/710
8,954,521 B1 *  2/2015  Faaborg ................. H04L 51/32
                                              709/206

(Continued)

FOREIGN PATENT DOCUMENTS

| KR | 10-2015-0033902 | 4/2015 |
| WO | 2014/158521 | 10/2014 |
| WO | 2015/142442 | 9/2015 |

OTHER PUBLICATIONS

International Search Report and Written Opinion in International Application No. PCT/KR2016/002638, dated Jul. 21, 2016, 15 pages.

*Primary Examiner* — Christopher J Fibbi

(74) *Attorney, Agent, or Firm* — Fish & Richardson P.C.

(57) ABSTRACT

A watch-type terminal includes a display and a wireless communication unit configured to communicate with an external terminal. The watch-type terminal also includes a controller that is configured to receive information related to an event that occurs in the external terminal, and determine, based on the received information, a priority level of the event that occurs in the external terminal. The controller is also configured to determine, based on the received information, a notification icon regarding the event that occurs in the external terminal, and adjust, based on the priority level of the event, a size of the notification icon. The controller is further configured to display, on the display of the watch-type terminal, the notification icon with the adjusted size.

19 Claims, 14 Drawing Sheets

(56) References Cited

U.S. PATENT DOCUMENTS

| | | | | |
|---|---|---|---|---|
| 9,351,110 B2* | 5/2016 | Masterman | ............ | H04W 4/02 |
| 9,462,570 B1* | 10/2016 | Bostick | ............... | G06F 17/2705 |
| 2010/0073160 A1* | 3/2010 | Gilmour | ............. | G06F 3/04817 |
| | | | | 340/540 |
| 2010/0112964 A1* | 5/2010 | Yi | ........................ | G04G 9/0064 |
| | | | | 455/90.3 |
| 2014/0344375 A1 | 11/2014 | Hauser et al. | | |
| 2015/0002304 A1 | 1/2015 | Sun et al. | | |
| 2015/0085621 A1 | 3/2015 | Hong et al. | | |
| 2015/0186092 A1* | 7/2015 | Francis | ................ | G06F 3/1423 |
| | | | | 345/520 |
| 2015/0286391 A1* | 10/2015 | Jacobs | .................... | G06F 1/163 |
| | | | | 715/771 |
| 2015/0378320 A1* | 12/2015 | Knight | ................ | G04G 13/026 |
| | | | | 368/107 |
| 2016/0062570 A1* | 3/2016 | Dascola | ................ | G06F 3/0482 |
| | | | | 715/765 |
| 2016/0086241 A1* | 3/2016 | Proulx | .................... | H04L 67/22 |
| | | | | 705/26.4 |
| 2016/0240154 A1* | 8/2016 | Forutanpour | ......... | G06F 3/0412 |
| 2016/0260414 A1* | 9/2016 | Yang | ..................... | G06F 3/0481 |

* cited by examiner

MOBILE TERMINAL AND METHOD OF CONTROLLING THE SAME

CROSS-REFERENCE TO RELATED APPLICATIONS

Pursuant to 35 U.S.C. § 119(a), this application claims the benefit of an earlier filing date and right of priority to Korean Application No. 10-2015-0142345, filed on Oct. 12, 2015, the content of which is incorporated by reference herein in its entirety.

TECHNICAL FIELD

The present disclosure relates to a watch-type terminal with a display that capable of executing a touch input.

BACKGROUND

Terminals may be generally classified as mobile/portable terminals or stationary terminals according to their mobility. Mobile terminals may also be classified as handheld terminals or vehicle-mounted terminals according to whether or not a user can directly carry the terminal.

Mobile terminals have become increasingly more functional. Examples of such functions include data and voice communications, capturing images and video via a camera, recording audio, playing music via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Mobile terminals have various possible designs. For example, some mobile terminals are designed to be worn on a user's body or clothing. In particular, watch-type terminals are a type of wearable device that can be worn to a user's wrist.

SUMMARY

Systems and techniques disclosed herein enable a watch-type terminal to adaptively display notifications regarding events that occur in an external mobile terminal that is communicative with the watch-type terminal. The watch-type terminal may adaptively display a notification based on a priority of an event that occurs on the mobile terminal.

In one aspect, a watch-type terminal may include a display and a wireless communication unit configured to communicate with an external terminal. The terminal may also include a controller configured to receive information related to an event that occurs in the external terminal; and determine, based on the received information, a priority level of the event that occurs in the external terminal. The controller may also be configured to determine, based on the received information, a notification icon regarding the event that occurs in the external terminal. The controller may further be configured to adjust, based on the priority level of the event, a size of the notification icon; and display, on the display of the watch-type terminal, the notification icon with the adjusted size.

In some implementations, the controller may be configured to adjust, based on the priority level of the event, the size of the notification icon by: selecting, based on the priority level of the event, a display region of the display; and adjusting the size of the notification icon to correspond to the selected display region of the display.

In some implementations, the controller may be configured to adjust, based on the priority level of the event, the size of the notification icon by: determining a reference region occupying a reference display area of the display; determining whether the priority level of the event meets a threshold level. The controller may also be configured to adjust, based on the priority level of the event, the size of the notification icon by: based on a determination that the priority level of the event meets the threshold level: selecting a first display region of the display having a first display area that is larger than the reference display area by a first amount; and adjusting the size of the notification icon to correspond to the selected first display region of the display. The controller may further be configured to adjust, based on the priority level of the event, the size of the notification icon by: based on a determination that the priority level of the event does not meet the threshold level: selecting a second display region of the display having a second display area that is smaller than the reference display area by a second amount; and adjusting the size of the notification icon to correspond to the selected second display region of the display.

In some implementations, the controller may further be configured to: select, based on the adjusted size of the notification icon, at least a portion of the received information related to the event; and display, on the display of the watch-type terminal and in conjunction with the notification icon, the selected portion of the received information.

In some implementations, the controller may further be configured to: determine, based on receiving the information related to the event, whether the display of the watch-type terminal is in an active mode; and based on a determination that the display is not in an active mode: activate only a region of the display corresponding to the adjusted size of the notification icon; and display the notification icon in the activated region of the display.

In some implementations, the controller may further be configured to: determine, based on the priority level of the event, a notification level that corresponds to the priority level; and output, along with displaying the notification icon, a notification signal having the determined notification level that corresponds to the priority level of the event.

In some implementations, the controller may be configured to determine the priority level of the event that occurs in the external terminal by: determining at least one of sender information corresponding to the event, an application type corresponding to the event, or a user input corresponding to the event; and determining the priority level of the event based on the at least one of the sender information, the application type, or the user input.

In some implementations, the controller may further be configured to: determine whether the priority level of the event meets a threshold level; and based on a determination that the priority level of the event meets the threshold level, continue displaying the notification icon until receiving an indication that a user acknowledges the notification icon.

In some implementations, the controller may further be configured to: determine whether the priority level of the event meets a threshold level; and based on a determination that the priority level of the event meets the threshold level, display the notification icon with a size that initially covers an entire display region of the display and subsequently decreases over a period of time.

In some implementations, the controller may further be configured to: determine whether the priority level of the event meets a threshold level; and based on a determination that the priority level of the event does not meet the threshold level, display the notification icon such that the notification icon disappears from the display or such that a location of the notification icon moves to a different region of the display.

In some implementations, the wireless communication unit may further be configured to receive location information of the external terminal. The controller may further be configured to: change the priority level of the event based on the received location information; and adjust the size of the notification icon based on the changed priority level.

In some implementations, the controller may further be configured to: access, from at least one computer memory, a historical pattern of a user responding to the displayed notification icon; determine whether the historical pattern of the user responding to the displayed notification icon satisfies a first condition; determine whether the received information related to the event includes a first text pattern; and based on a determination that the historical pattern of the user responding to the displayed notification icon satisfies the first condition or that the received information related to the event includes the first text pattern, change the priority level of the event.

In some implementations, the controller may further be configured to: determine that the historical pattern of the user responding to the notification icon includes a number of times that the user has acknowledged the notification icon; determine whether the number of times that the user has acknowledged the notification icon meets a threshold number; based on a determination that the number of times that the user has acknowledged the notification icon is meets the threshold number, increase the priority level of the corresponding event; and based on a determination that the number of times that the user has acknowledged the notification icon does not meet the threshold number, decrease the priority level of the corresponding event.

In some implementations, the controller may further be configured to: determine whether a first touch gesture is applied to the notification icon; and based on a determination that the first touch gesture is applied to the notification icon, change the priority level of the corresponding event.

In some implementations, the controller may further be configured to: based on changing the priority level of the event, display, for a predetermined amount of time, a notification message indicating the change in the priority level of the event.

In some implementations, the controller may further be configured to: determine whether a user has applied a second touch gesture to the notification icon; based on a determination that the user has applied the second touch gesture to the notification icon, display the notification icon such that the size of the notification icon changes from a first size to a second size in a direction corresponding to the second touch gesture; determine whether a duration of the second touch gesture is less than a predetermined time period; and based on a determination that the duration of the second touch gesture is less than the predetermined time period, display the notification icon such that the size of the notification icon reverts back to the first size.

In some implementations, the controller may further be configured to: based on the determination that the duration of the second touch gesture is less than the predetermined time period, determine that the user has acknowledged the corresponding event.

In some implementations, the controller may further be configured to: determine that the event that occurs in the external terminal corresponds to a message received by the external terminal; determine information regarding a sender of the message received by the external terminal; based on the information regarding the sender of the message, determine a priority level of the message; adjust the size of the notification icon based on the determined priority level of the message; and based on the adjusted size of the notification icon, determine at least a portion of the message to display with the notification icon having the adjusted size.

In some implementations, the watch-type terminal may further include a bezel surrounding the display. The display may be configured to sense a touch input. The controller may further be configured to: determine whether a first drag-type touch input is applied on the display in a direction away from the notification icon and toward the bezel surrounding the display; and based on a determination that the first drag-type touch input is applied in the direction away from the notification icon and toward the bezel, reduce the size of the notification icon and change a display position of the notification icon to a location on the display where the first drag-type touch input terminates.

In some implementations, the controller may further be configured to: determine whether a second drag-type touch input is applied on the display in a direction toward a center of the display and away from the location on the display where the first drag-type touch input terminates; and based on a determination that the second drag-type touch input is applied in the direction toward the center of the display and away from the location on the display where the first drag-type touch input terminates, display an execution screen of an application corresponding to the notification icon such that the execution screen moves on the display in accordance with the drag-type touch input.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Figure 1A:
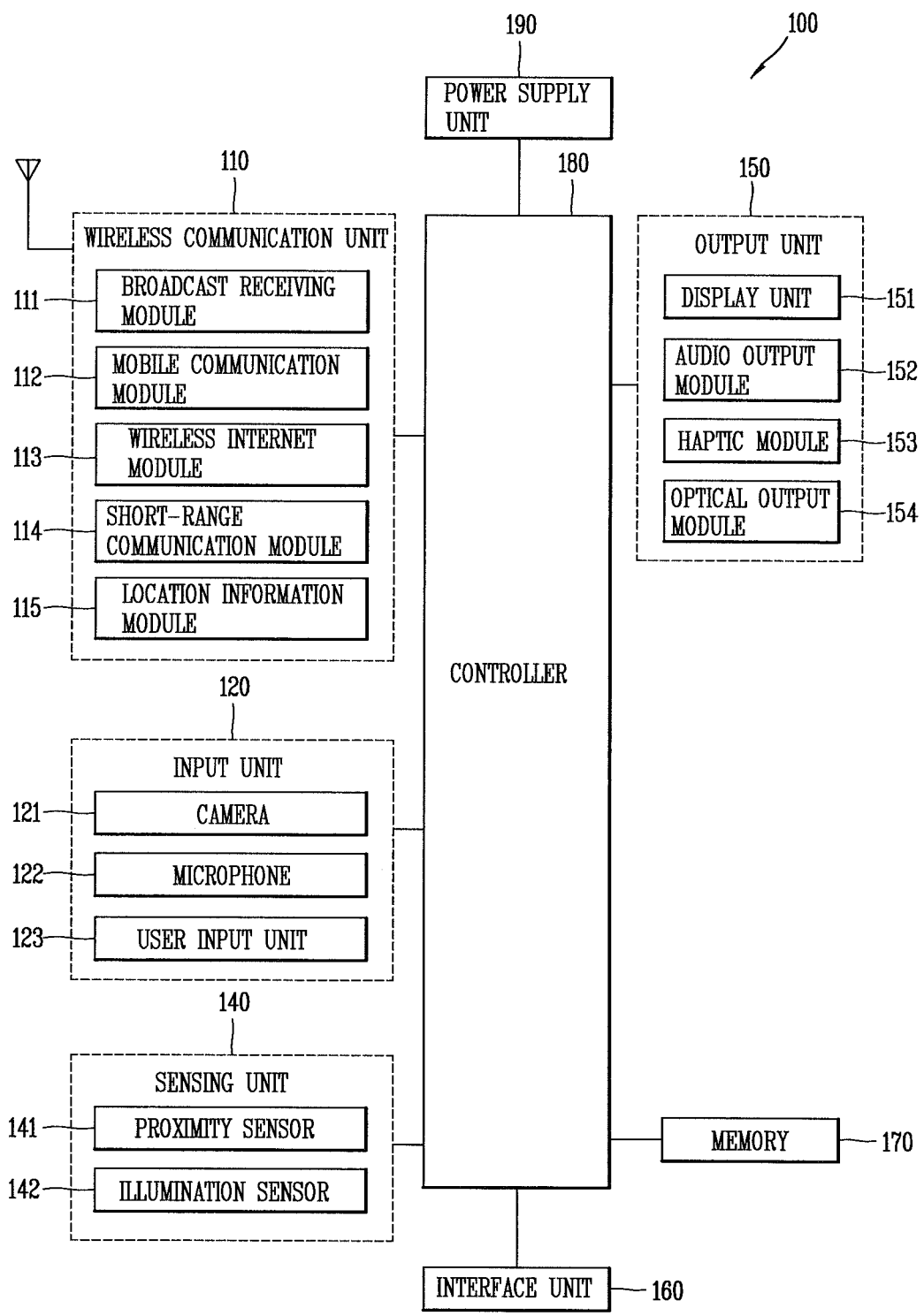
FIG. 1A is a block diagram illustrating an example of a mobile terminal.

A watch-type terminal may display notifications regarding events that occur on an external mobile terminal that is communicative with the watch-type terminal. The watch-type terminal may be, for example, wirelessly connected with the external mobile terminal, which may be a phone or other portable electronic device, as examples. When an event occurs on the external mobile terminal, the user may be notified through the watch-type terminal. However, watch-type terminals typically have a display area that is limited in size. Thus, displaying notifications in a watch-type terminal can cause the display to look cluttered, and can also increase battery consumption in the watch-type terminal.

Systems and techniques disclosed herein enable a watch-type terminal to adaptively display notifications regarding events that occur in the external mobile terminal, based on priority levels of events. The priority levels of events may be determined based on an estimate of a user's interest in the events. The estimate may be based on a variety of factors, for example, based on information regarding the event itself, such a particular word or phrase in the event, or based on a user's previous responses to notifications of similar events. The watch-type terminal may also enable various touch-input operations by a user to manage and respond to notifications. As such, the watch-type terminal may adaptively and intelligently generate and manage notifications according to relevance for a user.

A watch-type terminal 100 according to some implementations works in conjunction with a mobile terminal. Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers and a digital signage.

The watch-type terminal 100 may exchange data with (or work with) a mobile terminal. To this end, the short-range communication module of the watch-type terminal 100 may detect (or recognize) a terminal that it can communicate with in the vicinity. Inversely, the short-range communication module of the mobile terminal may detect (or recognize) a watch-type terminal that it can communicate with in the vicinity. For example, the watch-type terminal 100 and the mobile terminal may communicate with each other through Bluetooth communication BT or Wi-Fi communication.

The following description will be made on the assumption that the watch-type terminal 100 and the mobile terminal are located within a close distance to each other and stay connected or at least can be immediately connected.

Figure 1B:
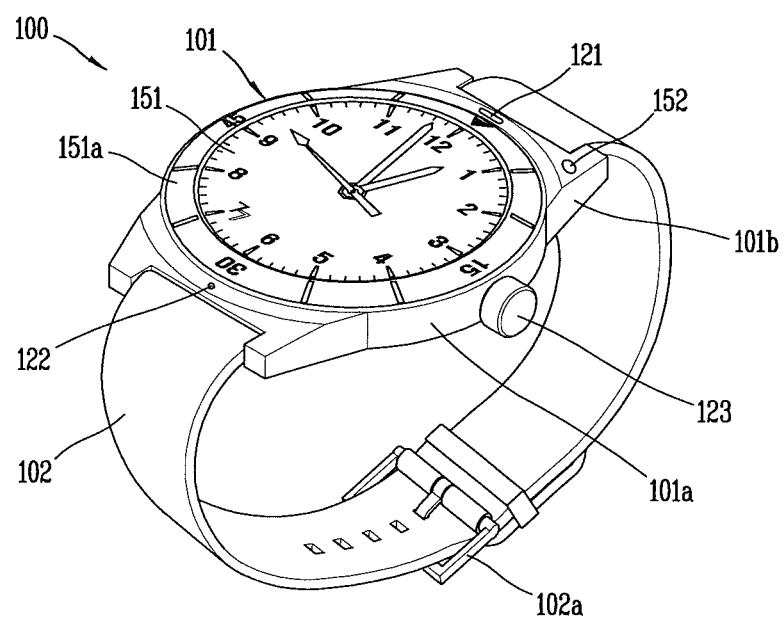
FIG. 1B is a diagram illustrating an example of a watch-type terminal.

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various implementations to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some implementations, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some implementations, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some implementations, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some implementations, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some implementations, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary implementations disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

FIG. 1B is a perspective view illustrating one example of the watch-type mobile terminal 100.

As illustrated in FIG. 1B, the watch-type mobile terminal 100 includes a main body 101 with a display unit 151 and a band 102 connected to the main body 101 to be wearable on a wrist. In general, mobile terminal 100 may be configured to include features that are the same or similar to that of mobile terminal 100 of FIG. 1A.

The main body 101 may include a case having a certain appearance. As illustrated, the case may include a first case 101a and a second case 101b cooperatively defining an inner space for accommodating various electronic components. Other configurations are possible. For instance, a single case may alternatively be implemented, with such a case being configured to define the inner space, thereby implementing a mobile terminal 100 with a uni-body.

The watch-type mobile terminal 100 can perform wireless communication, and an antenna for the wireless communication can be installed in the main body 101. The antenna may extend its function using the case. For example, a case including a conductive material may be electrically connected to the antenna to extend a ground area or a radiation area.

The display unit 151 is shown located at the front side of the main body 101 so that displayed information is viewable to a user. In some implementations, the display unit 151 includes a touch sensor so that the display unit can function as a touch screen. As illustrated, bezel 151a is positioned on the first case 101a to form a front surface of the terminal body together with the first case 101a.

The illustrated implementation includes audio output module 152, a camera 121, a microphone 122, and a user input unit 123 positioned on the main body 101. When the display unit 151 is implemented as a touch screen, additional function keys may be minimized or eliminated. For example, when the touch screen is implemented, the user input unit 123 may be omitted.

The band 102 is commonly worn on the user's wrist and may be made of a flexible material for facilitating wearing of the device. As one example, the band 102 may be made of fur, rubber, silicon, synthetic resin, or the like. The band 102 may also be configured to be detachable from the main body 101. Accordingly, the band 102 may be replaceable with various types of bands according to a user's preference.

In one configuration, the band 102 may be used for extending the performance of the antenna. For example, the band may include therein a ground extending portion (not shown) electrically connected to the antenna to extend a ground area.

The band 102 may include fastener 102a. The fastener 102a may be implemented into a buckle type, a snap-fit hook structure, a Velcro® type, or the like, and include a flexible section or material. The drawing illustrates an example that the fastener 102a is implemented using a buckle.

Moreover, a bezel 151a surrounding the display 151 may be provided on the edge of the display 151. Also, a touch sensor capable of sensing touch input may be provided on the bezel 151a.

The above-explained watch-type terminal 100 according to an exemplary implementation is connected to an external terminal, and when an event occurs in at least one application installed on the external terminal, the watch-type terminal 100 receives corresponding event-related information. The controller 180 of the watch-type terminal 100 may determine the priority of the event based on the event-related information. Depending on the priority of the event, the size of a notification icon may change with respect to the center of the display. That is, notification icons of different sizes for different events may appear. Concretely, if the priority level set for an event is low, the notification icon may be smaller in size to expose the hour hand and minute hand of the watch and the event-related information may not be exposed or limited to the minimum necessary. On the other hand, if the priority level set for the event is high, the notification icon may be larger in size and the event-related information may be fully exposed or related additional information may be displayed as well. As such, different notifications may be provided depending on the priority of an event.

As used herein, "event" refers to an occurrence which impacts the operation of at least one application installed on a mobile terminal, an occurrence that changes the categories in a database (or data file) associated with at least one application, or a transfer or transmission of data to an external terminal or external network through the at least one application. Examples of events may include 'call reception', 'message reception', etc.

As used herein, 'priority of event' refers a classification of the priority level of an event according to preset criteria. In this specification, the priority level may be set based on user input, sender information, application type, etc., and the set priority level may be changed according to the user's pattern of making a response to the event. For example, the priority level of a call or message received may be set differently for each sender.

Figure 2:
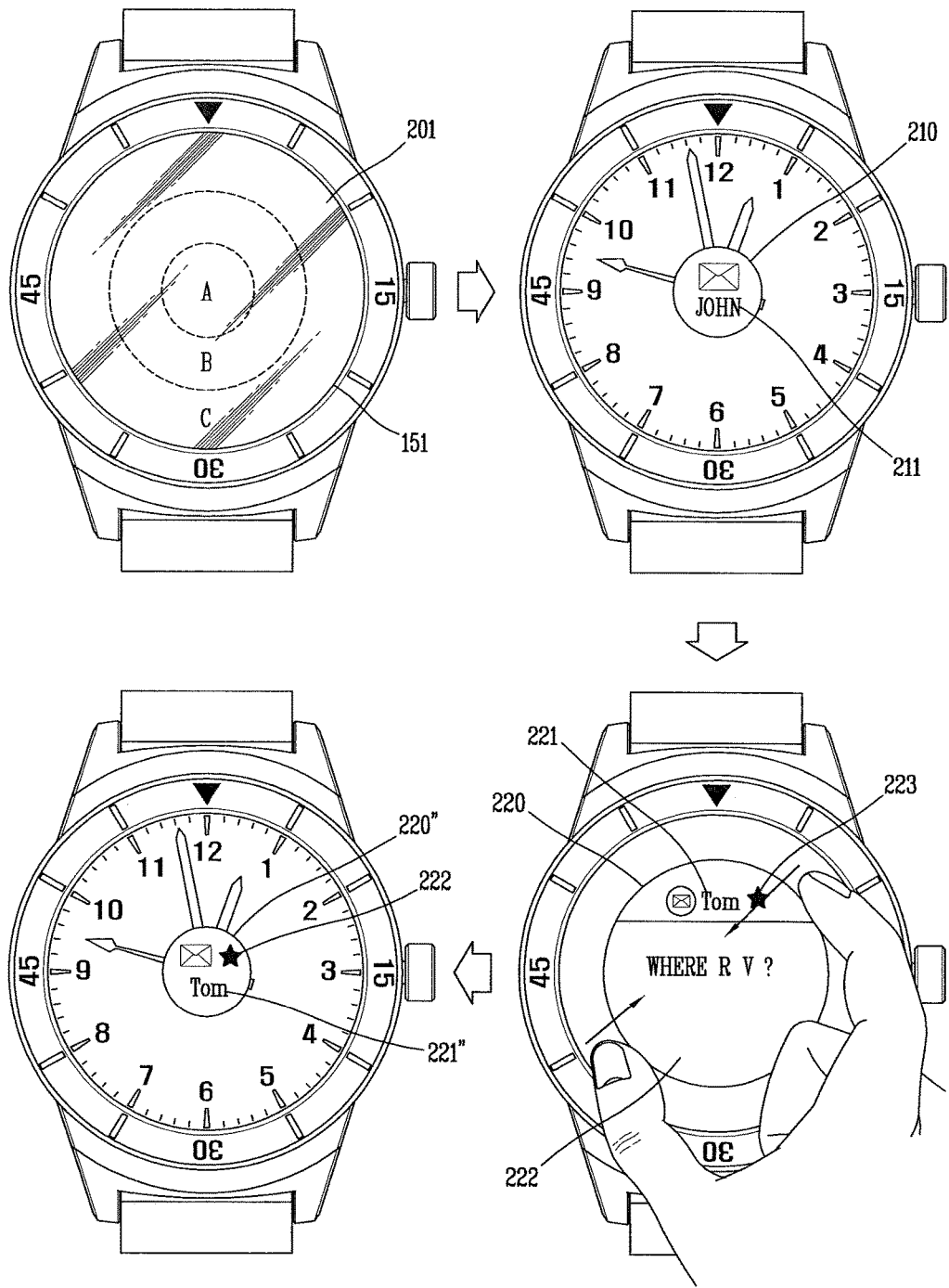
FIG. 2 is a diagram illustrating an example of an operation of a watch-type terminal.

FIG. 2 is a diagram illustrating an example of an operation of a watch-type terminal.

Referring to FIG. 2, the controller 180 may display, on the display 151 of the watch-type terminal 100, notification icons of different sizes that inform of the occurrence of different events. In this example, the size of a notification icon is determined based on the priority level of the event corresponding to the notification icon. Also, as described above, the priority level of an event may be set based on user input or changed according to the user's pattern of making a response to the event.

The display 151 may include different virtual areas in which the display area of the corresponding notification icon is gradually enlarged as the priority level of an event increases. In the example of FIG. 2, a notification icon displayed in a first area A may correspond to a particular priority level, and as the priority level is increased, an enlarged notification icon may be displayed in a second area B or third area C. Also, once the notification icon is enlarged in size, the amount of information shown in the notification icon and the display range may also increase.

Referring to the example of FIG. 2, when a message is received by a connected external terminal while the display 151 is not active, for example while the display 151 is in a sleep mode, then the first area A of the display 151 may be activated and a first notification icon 210 indicating the receipt of a message by the external terminal may be displayed.

The first notification icon 210 may correspond to a lowest priority level. The controller 180 may activate only the first area A when displaying the first notification icon 210, and may control the area outside the first area A to remain inactive. The first notification icon 210 may show minimum information related to the received message, for example, sender information 221.

Next, when a message with a higher priority level is received by the connected external terminal 200, the display region of the display 151 of the watch-type terminal 100 may be extended to the second area (B) and a second notification icon 220 may be displayed. In this case, the first notification icon 210 may disappear from the display 151, or be hidden while the second notification icon 220 is displayed in the extended second area B. In some implementations, the controller may display only the second notification icon 220 and not the first notification icon 210

In the example of FIG. 2, the higher-priority second notification icon 220 may show event-related information, including the content (e.g., the text "Where R U") 223 of the received message and an image object (e.g., the symbol "★") 222 indicating the priority level, as well as the sender information 221. In some implementations, if the amount of event-related information is large, then the controller 180 may display, on at least one side of the second notification icon 220, a scroll bar for moving the displayed event-related information up-and-down or left-and-right.

Also, the second notification icon 220 may be displayed as a different image from that of the first notification icon 210 so as to easily indicate that the second event has a higher priority level. For example, the different image may be an image of a notification icon that is displayed on the display 151 that differs in area, length, transparency, and highlighting effect.

When a particular touch gesture e.g., pinch-in touch input, is applied to the displayed second notification icon 220, the controller 180 may reduce the size of the second notification icon 220 so as to display it in the smaller first area A (220"). In this case, the amount of reduction in size of the second notification icon 220 may correspond to the intensity of the pinch-in touch input. In some implementations, the display of event-related information in the reduced second notification icon 220" is limited. For example, sender information 221" and an object 222 indicating the priority level may be shown in the modified second notification icon 220", and at least part of the content of the received message may disappear or be hidden.

In this case, the priority level for the event corresponding to the second notification icon 220 may remain as before. Accordingly, when a message is received from the same sender (Tom) at a later time, a notification icon indicating the receipt of a message may appear again in the second area B.

Otherwise, if a message is received from the same sender (Tom) with a lower priority level set for the event corresponding to the second notification icon 220, then the corresponding notification icon may appear in the smaller first area A or only on the connected mobile terminal.

The watch-type terminal according to the example above may provide a notification message that is distinguished from that of the mobile terminal by determining the priority of a message received by the connected mobile terminal by sender.

Figure 3:
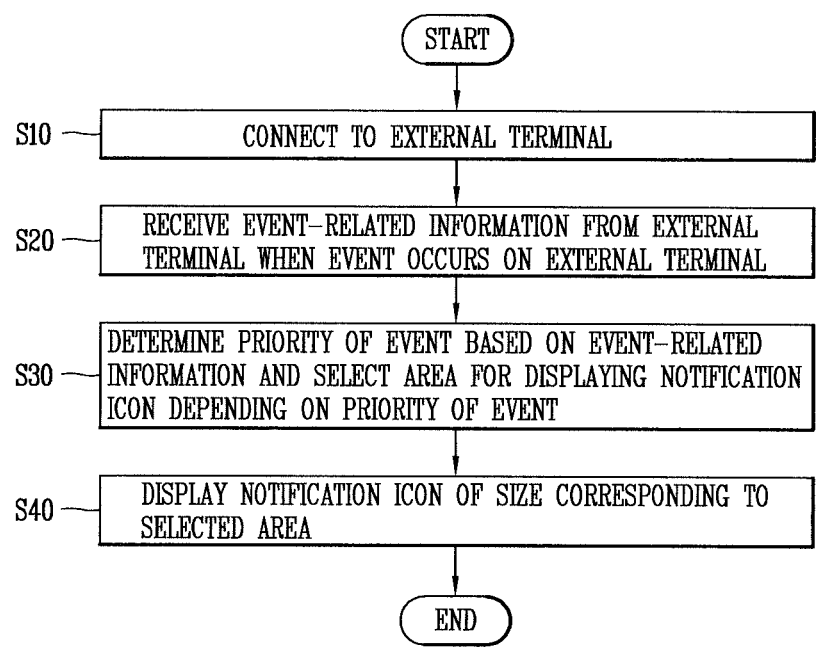
FIG. 3 is a flowchart illustrating an example of operations of a watch-type terminal.

FIG. 3 is a flowchart illustrating an example of an operation method of a watch-type terminal.

The watch-type terminal 100 and at least one external terminal may be connected to send and receive data (S10). For example, the watch-type terminal 100 and at least one mobile terminal may be connected through Bluetooth communication BT or Wi-Fi communication.

Next, when an event occurs to at least one application installed on the connected external terminal, the controller 180 of the watch-type terminal 100 receives event-related information from the external terminal (S20).

As used herein, the event-related information is detailed information that informs of event identification information and the content of the event, which varies depending on the type of the event. In an example, when an event of message reception from a mobile terminal occurs, the event-related information may include sender information, message content, the time of receipt, the location of the mobile terminal at the time of receipt of the message, and the operating status of the mobile terminal.

Meanwhile, if the watch-type terminal 100 can detect an event even when the power of the external terminal is off or the external terminal is not connected, the above steps S10 and S20 are omitted and instead the step in which the watch-type terminal 100 detects the occurrence of an event may be added.

Then, the controller 180 determines the priority level of the event based on the event-related information. Also, the controller 180 selects a display area for displaying a notification icon indicating the event depending on the determined priority of the event (S30).

To this end, the display 151 includes a plurality of areas of different sizes, and the notification icon appears in any one of the plurality of areas in response to a control signal received from the controller 180.

As an example, the plurality of areas may be display areas that can be gradually enlarged or reduced from a reference area on the display 151. Also, the reference area corresponds to a display area that is expanded in area from the center of the display 151 by a predetermined amount. Accordingly, if the priority of the event is lower than or equal to a reference level, the reference area or an area (hereinafter, 'the smallest area') smaller than the reference area may be selected. Similarly, if the priority of the event is higher than the reference level, an area (hereinafter, the largest area') larger than the reference area may be selected. The smallest area takes up as little of the screen being shown on the display 151 as possible, and the largest area blocks most or all of the screen being shown on the display 151. That is, if the priority of the event is low, the smallest area is selected to take up as little of the screen as possible, and if the priority of the event is high, the largest area is selected because it is important to indicate the event even if it blocks the screen.

As used herein, the priority level of the event may be preset based on at least one of the following: sender information corresponding to the event, an application type corresponding to the event, and user input. Also, even if the priority level is set differently for each sender, for example, the priority level may be set low for a situation such as a group chat.

As used herein, the extent of exposure of the event-related information refers to variation of the type of information shown in the notification icon, the amount of the information, the size of text or image included in the formation, sharpness, etc.

Next, the controller 180 adjusts the size of the notification icon to a size corresponding to the selected display area, and then displays the notification icon on the display 151 (S40). That is, the controller 180 may determine the size of the notification information in proportion to the priority level of the event.

As an example, if the priority of the event is higher than the reference level, 'the largest area' may be selected as an area for displaying the notification icon, and the controller 180 may expand the size of the notification icon to correspond to the area occupied by the selected largest area. Similarly, if the priority of the event is lower than or equal to the reference level, 'the reference area' or 'the smallest area' may be selected as an area for displaying the notification icon. The controller 180 may maintain or reduce the size of the notification icon to correspond to the area occupied by the selected display area.

If some implementations, the priority level of a message received by a terminal may be set differently for each sender. For example, the priority level of a first sender may be set to the lowest level (e.g., Level 1) and the priority level of a second sender may be set to the highest level (e.g., Level 3). In this case, a notification icon corresponding to a message received from the first sender may be determined to be the smallest so as to display the notification icon in the reference area or the smallest area. On the contrary, a notification icon corresponding to a message received from the second sender may be determined to be the largest so as to display the notification icon in the entire largest area.

Once the size of the notification icon is determined, the controller 180 may adjust the extent of exposure of the event-related information to correspond to the determined size of the notification icon.

In the above example, minimum information related to the event, for example, sender information (e.g., name) may be displayed in the notification icon corresponding to the first sender. On the contrary, detailed information related to the event, for example, message content, the time of receipt, and an area for writing a reply, may be displayed on the notification icon corresponding to the second sender.

As described above, virtual areas corresponding to different sizes of the notification icon may be included in the display 151, and the notification icon may appear in the area corresponding to the determined size. For example, as shown in FIG. 2, the notification icon may appear in a predetermined circular area A at the center of the display 151 or in any one of a plurality of areas B and C extending gradually from the area A. Hereinafter, a description will be made on the assumption that the area B is the reference area.

Upon receiving event-related information from the connected external terminal, the controller 180 may activate only an area corresponding to the determined size of the notification icon and display the notification icon.

Also, the controller 180 may control the display status of the notification icon in the corresponding display area—for example, the shape, transparency, color, etc. of the notification icon—, or the display or operating status of the screen on the display 151, depending on the determined size of the notification icon.

For example, when displaying the notification icon in the reference area B or the smallest area A, the transparency of the notification icon may be increased so that as little of the screen of the display 151 is taken up as possible. On the other hand, when displaying the notification icon in the largest area C, the transparency of the notification icon is set to 0 and displayed in a color distinguished from the color of the background image, thereby highlighting the display of the notification icon. In another example, when a message with the highest priority level is received from the external terminal while a video is being played on the display 151, the video may be paused and a notification icon may be displayed on the whole side of the display 151 for several seconds.

If the priority level of an event is higher than the reference level, the controller 180 may display a menu icon for making a response to the event as well as a notification icon, and the notification icon may continue to be displayed until the user acknowledges it. As used herein, the reference level may correspond to an intermediate priority level, for example, the second area B of FIG. 2.

If the priority level of the event is lower than or equal to the reference level, the controller 180 may get the notification icon to disappear from the display 151 or move it to another area, with the passage of a reference time. The other area may correspond to a point where touch input ends.

Meanwhile, the controller 180 may display a distinguished notification signal or notification pattern depending on the size of the notification icon corresponding to the priority level of the event. For example, referring back to FIG. 2, if the notification icon is displayed in the first area A, the controller 180 may only turn on the screen, if the notification icon is displayed in the second area B, the controller 180 may produce a sound and/or vibration with a reference intensity, and if the notification icon is displayed in the third area C, the controller 180 may output a notification signal with a sound and/or vibration with an intensity greater than the reference intensity.

In this way, the watch-type terminal allows an event notification to take up as little of the screen if it is of low priority and allows the event notification to be displayed along with related detailed information if it is of high priority, by providing a distinguished notification for an event that occurs on the mobile terminal. Hence, the watch-type terminal provides user convenience.

Figure 4:
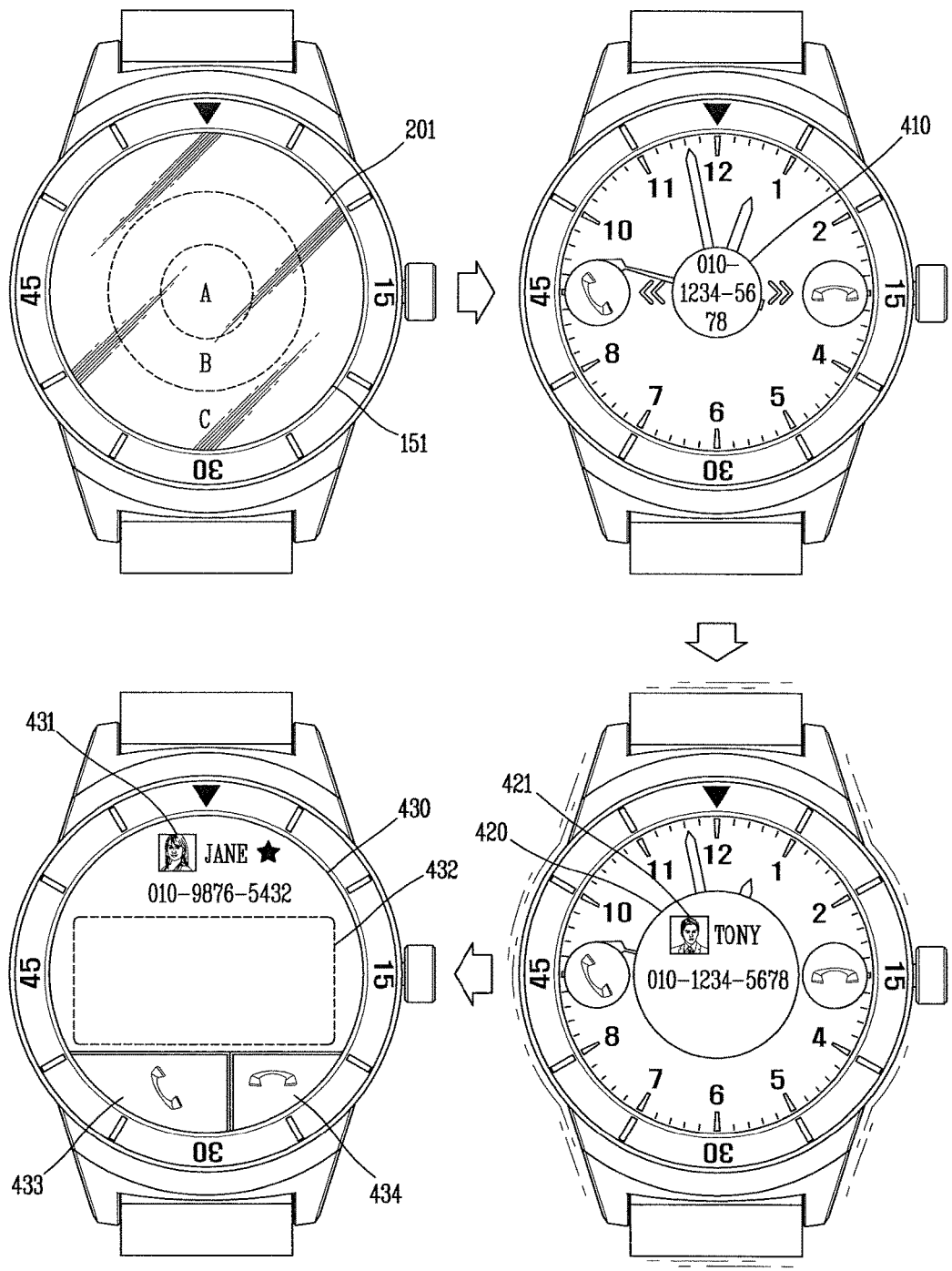
FIG. 4 is a diagram illustrating an example of a notification icon that depends on the sender of a call, according to some implementations.
Figure 5:
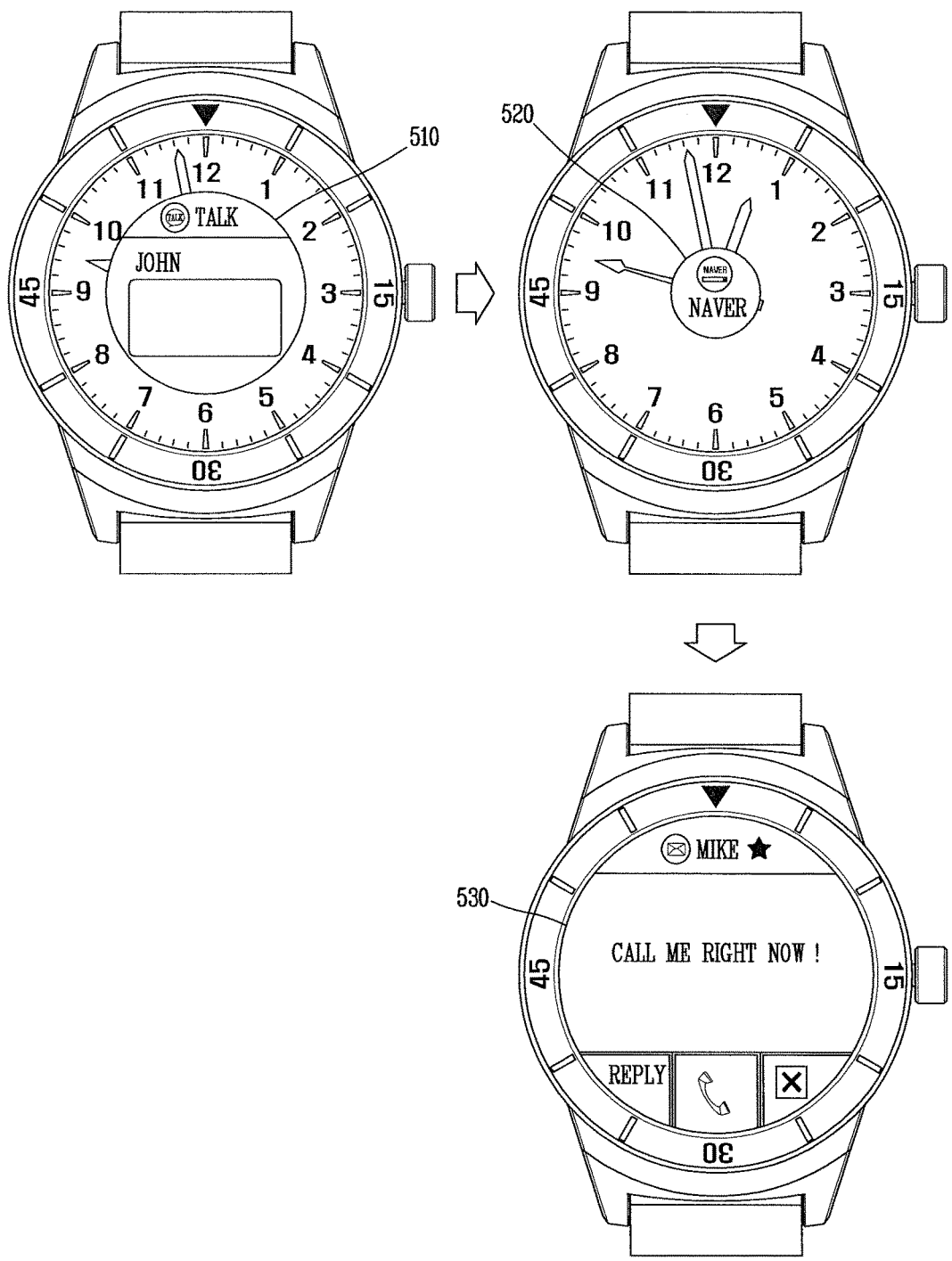
FIG. 5 is a diagram illustrating an example of a notification icon that depends on the application type, according to some implementations.

FIGS. 4 and 5 show examples in which a notification icon for an event varies depending on the priority level of the event.

As an example, FIG. 4 shows conceptual views for explaining variation of a notification icon depending on the sender of a call, and FIG. 5 shows conceptual views for explaining variation of a notification icon depending on the application type.

First, referring to FIG. 4, when a call signal is received by the mobile terminal communicating with the watch-type terminal while the display 151 is not active, then a notification icon indicating the receipt of a call may be displayed on the display 151 of the watch-type terminal.

In this case, the controller 180 may determine the size of the notification icon based on the priority level set for the received call, or determine the size of the notification icon by assessing the priority level based on sender information corresponding to the received call.

If the priority level of the received call is the lowest, a first notification icon 410 of the smallest size may appear in the reference area of the display 151. In this instance, as shown in the drawing, sender information (e.g., phone number) alone or information (e.g., phone image) simply indicating the receipt of the call may be displayed in the first notification icon 410. Meanwhile, menu objects related to a response to the call may be displayed together on the display 151, and the user may respond to or reject the call by dragging the displayed menu objects left and right.

If the priority level of the received call is intermediate, a second notification icon 420 of a larger size may appear across an area extending from the reference area of the display 151. As shown in the drawing, an image 421 saved in a contact list, which is event-related information, may be further exposed in the second notification icon 420. The second notification icon 420 may be displayed with a lower transparency than that of the first notification icon 410 or in a color distinguishable with the eye, and the background image of the second notification icon 420 may be displayed with a predetermined transparency.

If the priority level of the received call is the highest, a third notification icon 430 indicating the receipt of the call may appear on the whole side of the display 151. The event-related information may be further exposed on the third notification icon 430. For example, a record of recent calls related to the sender, a record of recently sent/received message, related memos, etc., as well as the image 431 saved in the contact list, may be displayed in an output area 432. Also, an image object (e.g., ★) indicating the priority level and menus related to making a response to the call may be further displayed in the third notification icon 430.

While the foregoing description has been made with respect to an example in which the priority level of an event and the display area of the corresponding notification icon are classified as three types, implementations are not limited to this example and they may be classified as fewer or more than three types.

In some implementations, the controller 180 may vary a notification level of the corresponding notification signal, for example, by varying a level of a sound, a vibration, a visible flicker, and/or a moving pattern of the notification icon, depending on the determined size of the notification icon. Accordingly, when an event occurs, a notification signal with a notification level that corresponds to the size of the notification icon displayed on the display 151 may be output. For example, if the priority level of a received call is low, then the notification icon may only visibly flicker without any audible sound on the display 151, and if the priority level of the received call is high, then a vibration or an audible sound may be produced as well.

Also, the controller 180 may vary the time it takes for the notification icon to disappear depending on the size of the notification icon displayed on the display 151. For example, if a notification icon indicating that no response is made to the received call appears later as shown in FIG. 4, the display time of the notification icon increases as the size of the notification icon increases.

Next, referring to FIG. 5, the controller 180 may set different priority levels for different application types. Afterwards, when an event occurs on a particular application, the size of a notification icon indicating the event changes depending on the priority level set for the event, and therefore the extent of exposure of event-related information varies.

According to some implementations, as shown in FIG. 5, an application type, sender information, and at least part of a received message may be shown in a notification icon 510 corresponding to an event that has occurred on a first application. In some cases, only an application type may be shown in a notification icon 520 corresponding to an event that has occurred on a second application. Also, an application type, sender information, a received message, and a menu area for making a response may be shown in a notification icon 530 corresponding to an event that has occurred on a second application.

The controller 180 may block notifications or apply different priority levels depending on the type of an event occurring on each application, even when different priority levels are set for different application types. For example, as shown in FIG. 5, the notification icon 530 may be displayed only when a message is received by a third application from a particular person. Also, as shown in FIG. 5, the notification icon 520 may be displayed only when a post related to a keyword set by the user is uploaded on a particular webpage, and notifications of other events occurring on the first application may be blocked.

Figure 6A:
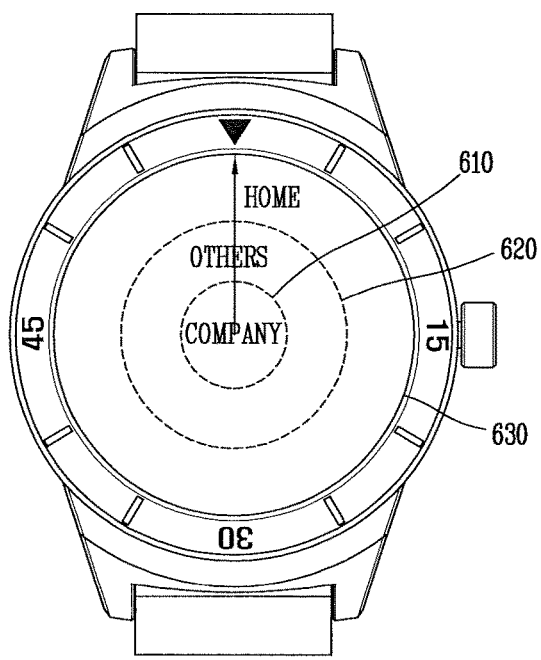
FIGS. 6A and 6B are diagrams illustrating examples in which a notification icon corresponding to an event varies depending on the location of a mobile terminal, according to some implementations.
Figure 6B:
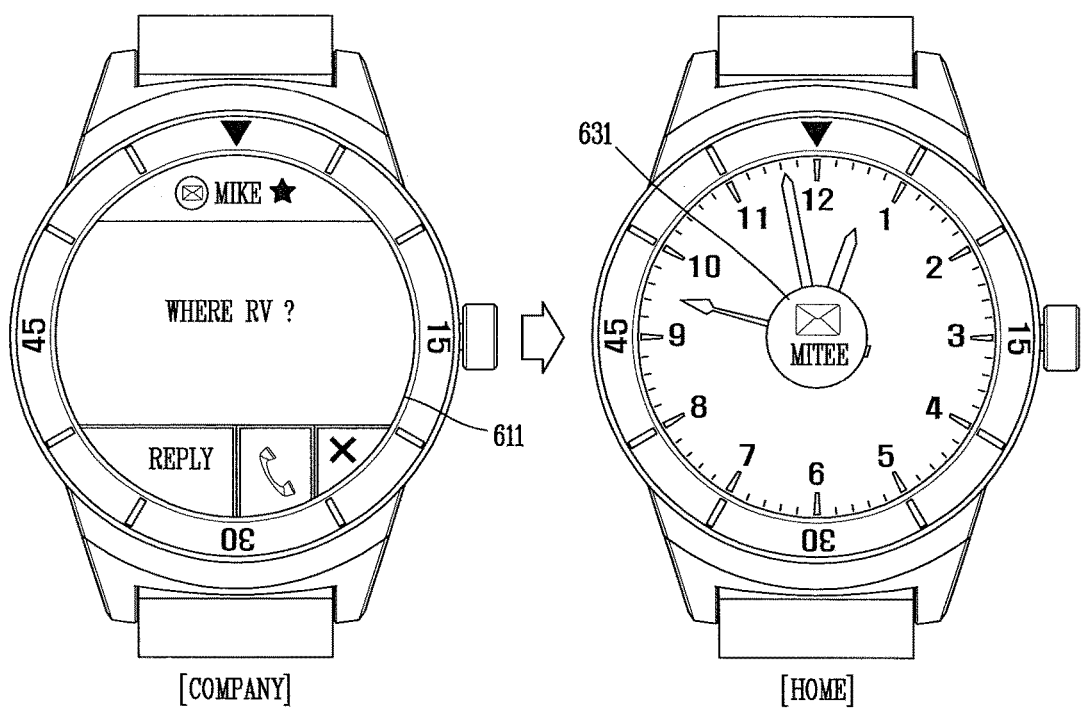

FIGS. 6A and 6B are diagrams illustrating examples in which a notification icon corresponding to an event varies depending on the location of a mobile terminal.

To this end, the wireless communication unit 110 of the watch-type terminal 100 may receive location information about the connected mobile terminal. Concretely, the wireless communication unit 110 may obtain the location of the mobile terminal by using a signal sent from a GPS satellite or based on wireless AP (wireless access point) information for sending and receiving a wireless signal to and from a Wi-Fi module.

Next, the controller 180 may change the priority level of an event based on received location information and change the size of a notification ion corresponding to the event and the extent of exposure of event-related information based on the changed priority level.

The controller 180 may determine the display area for displaying the notification icon, i.e., the size of the notification icon, in association with the location of the mobile terminal. That is, the controller 180 may change the size of a notification icon for a sender belonging to a particular group by location.

For example, if the terminal's location is 'Home', a notification icon of the largest size may be displayed upon receiving a message from a group related to Home in the contact list, for example, a family or friend. On the other hand, when a message is received from other groups, for example, a colleague at work, a notification icon of the smallest size may be displayed for privacy protection, in which case, however, notification icons of the largest size may be displayed in emergency situations (e.g., a message contains text, phrase, etc. requiring emergency attention).

If the terminal's location is changed, the priority level of the sender is updated to correspond to the changed location. That is, the controller 180 may change the priority level of the same event according to the terminal's location, or temporarily change the priority level of an event if the terminal is in a particular location.

For example, as shown in FIG. 6B, when a message is received from a colleague 'MIKE', the priority level may be changed according to the location and the size of the notification icon may be changed. Concretely, when a message is received from the colleague 'MIKE' when the user is in the company, a notification icon 611 may be displayed on the whole side of the display 151, and when a message is received from the colleague 'MIKE' when the user is at home, a notification icon 631 of the smallest size may be displayed.

Figure 7A:
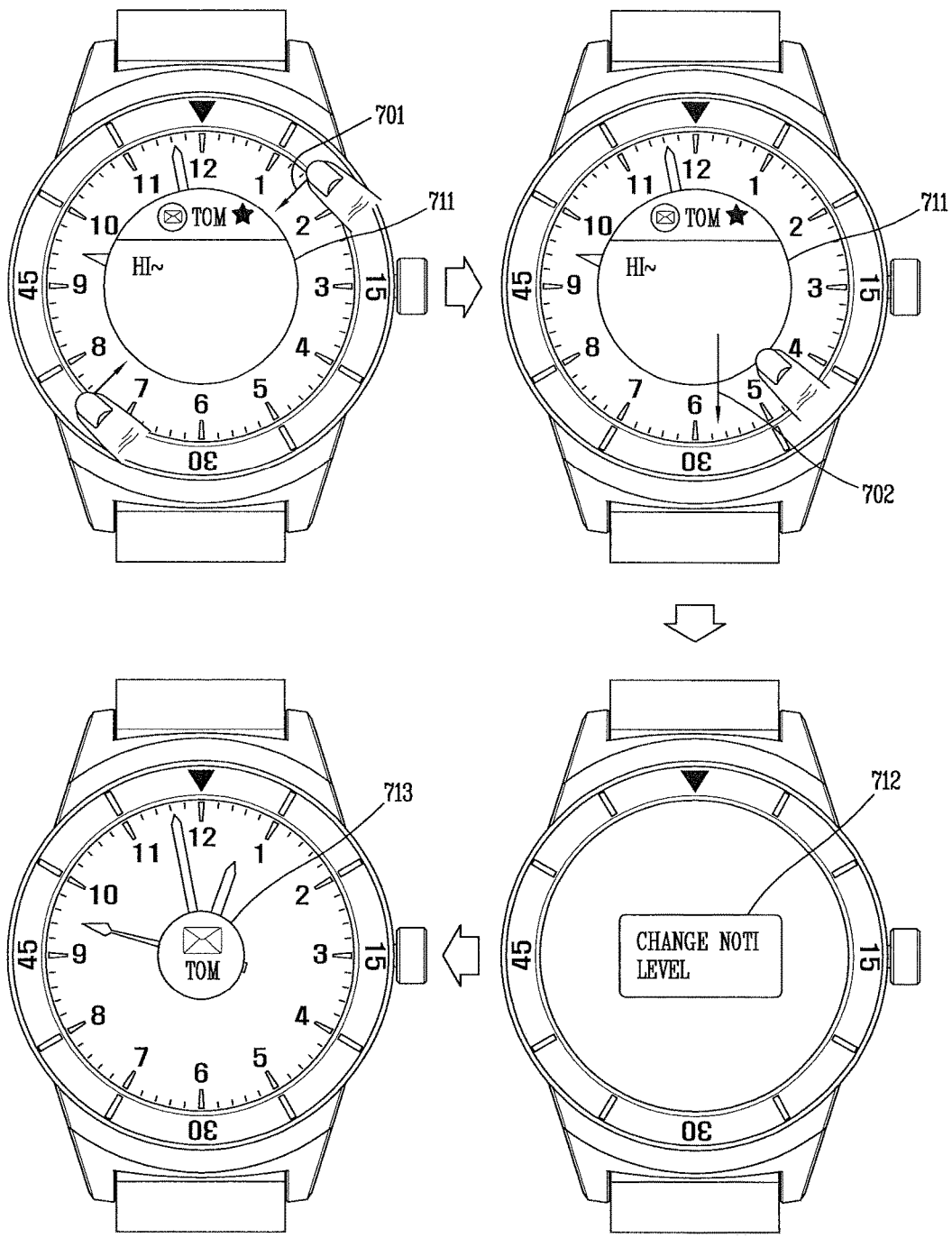
FIGS. 7A to 7C are diagrams illustrating examples of changing the display of a notification icon corresponding to an event based on a touch gesture, according to some implementations.
Figure 7B:
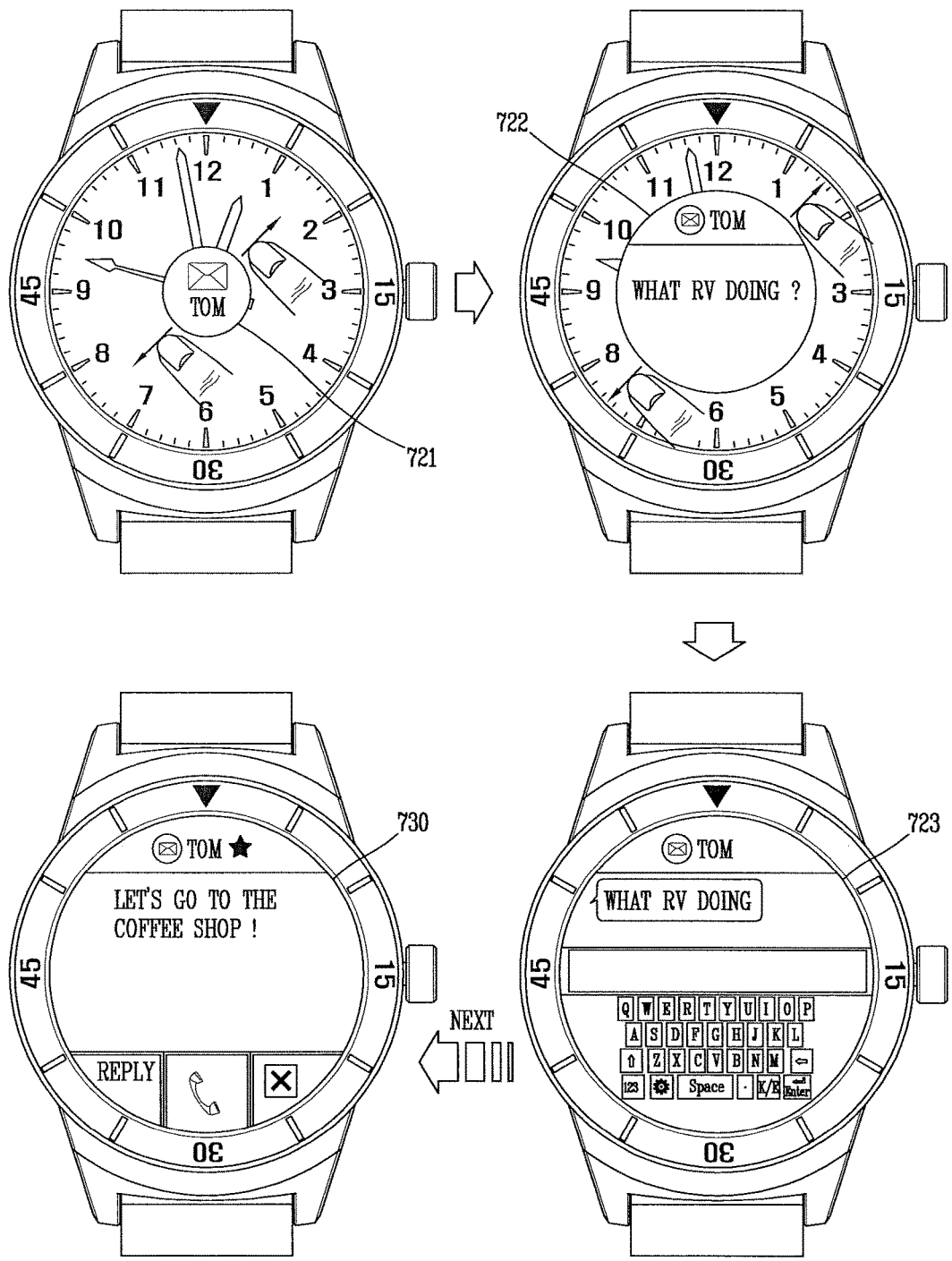
Figure 7C:
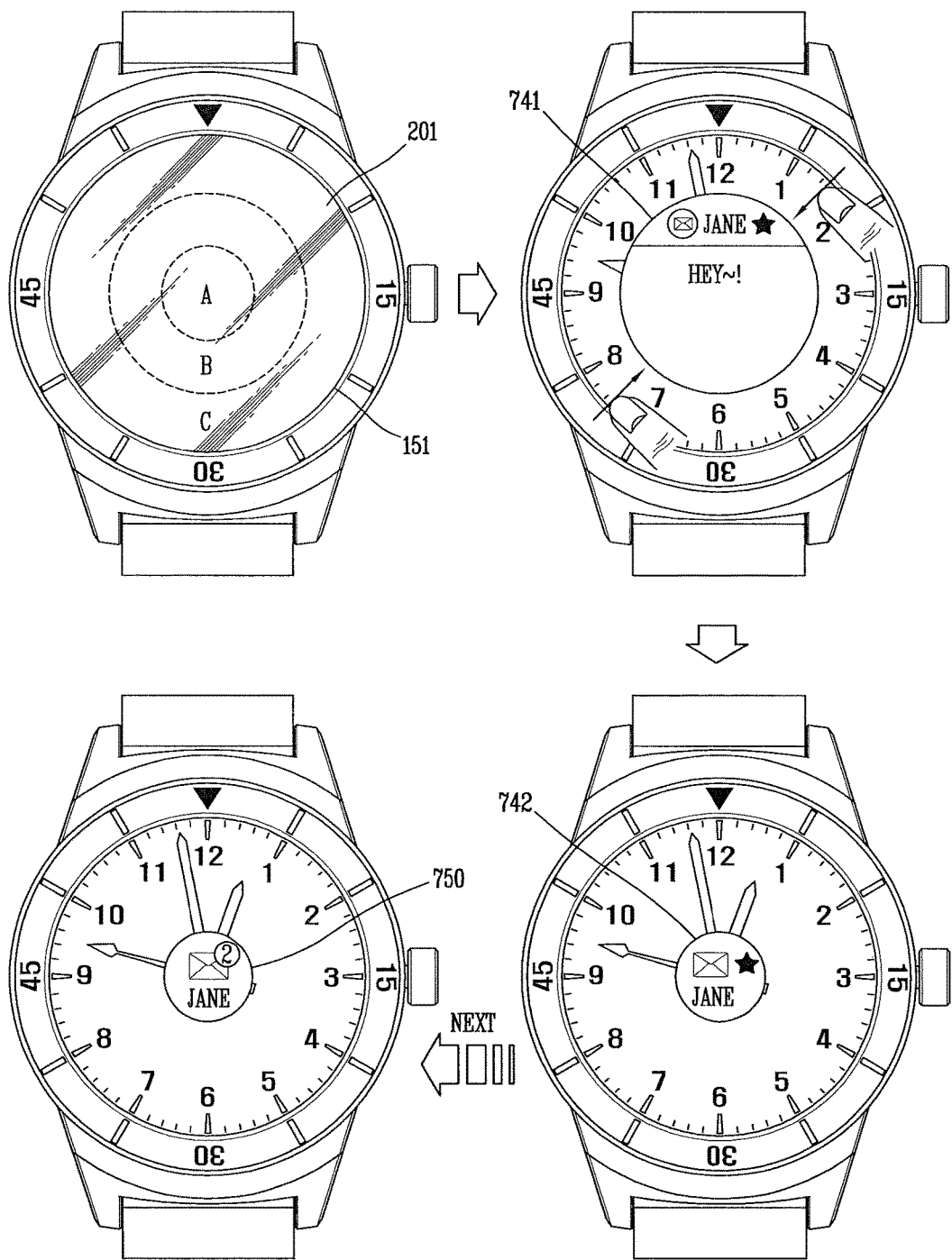

FIGS. 7A to 7C are conceptual views for explaining examples of a method of changing the display of a notification icon corresponding to an event based on a touch gesture according to an exemplary implementation.

When a notification icon appears on the display 151, the controller 180 may change the priority level set for the event according to the user's pattern of making a response to the notification icon.

Concretely, the controller 180 may change the priority level of the corresponding event by using a touch gesture on the displayed notification icon or by analyzing responses accumulated for the notification icon. Once the priority level of the event is changed, the size of a notification icon corresponding to the next event is changed.

FIG. 7A shows an example of making an immediate change to the priority level of a corresponding event based on a touch gesture on a displayed notification icon.

When an event occurs on the connected external terminal, the controller 180 of the watch-type terminal 100 may change the size of a notification icon indicating the event and the extent of exposure of event-related information shown in the notification icon, based on the priority level of the event.

When a preset touch gesture, e.g., pinch-in touch input, is applied to the edge of the notification icon while the notification icon is being displayed, the controller 180 may change the image of the displayed notification icon and control the event-related information displayed within the changed image. As used herein, changing the image usually means changing the area occupied by the image, and if necessary, the color, length, and shape of the image also may be changed in response to a touch gesture.

If an additional touch gesture subsequent to the preset touch gesture is applied to the notification icon within a predetermined time period or a different touch gesture (e.g., dragging down a touch point starting from the edge of the notification icon) is detected, the controller 180 may immediately change the priority level of the event corresponding to the notification icon.

When the priority level of the event corresponding to the notification icon is changed in response to an additional touch gesture, the controller 180 may display a message indicating the change in the priority of the event on the display 151.

For example, when a second touch gesture, such as a pinch-in touch input, is applied to the edge of a notification icon 710 while the notification icon 711 is being displayed in the second area B (of FIG. 2) of the display 151 as shown in FIG. 7A, and an additional touch gesture, for example, a touch on the notification icon 711, is dragged down within a predetermined time period, the priority level of the event corresponding to the notification icon 711 immediately goes down. Next, a window 712 containing a message indicating that the priority level of the event goes down pops up on the display 151. As the priority level of the event goes down, a notification icon 713 appears in the smallest area A (of FIG. 2). The previous priority level is not shown in the changed notification icon 713, but only minimum information like sender information is shown in the changed notification icon 713.

In some implementations, when a pinch-out touch input is applied to the notification icon 711 and an additional touch gesture, e.g., a touch on the notification icon 711, is dragged up within a predetermined time period, the priority level of the event corresponding to the notification icon 711 may immediately go up.

According to these examples, the priority of a notification of the occurrence of an event may be easily changed using a touch gesture, which offers convenience to the user.

FIGS. 7B and 7C are examples in which the priority level of an event is changed by analyzing user responses that have been accumulated for a displayed notification icon.

If the number of positive responses to a notification icon appearing on the display 151 is more than a reference value, the controller 180 may increase the priority level of the corresponding event. As such, the controller 180 may emphasize particular notification icons in which the user has repeatedly shown interest. Once the priority level of the event is increased, the size of a notification icon displayed when the event occurs later becomes larger than before.

For example, referring to FIG. 7B, when a message with the lowest priority level is received by a connected external terminal, an icon 721 indicating the receipt of a message in the smallest area A (of FIG. 2) is displayed on the display 151. When a preset touch gesture, for example, a pinch-out touch input, is applied to the displayed icon 721, the size of the icon 721 is enlarged and event-related information (e.g., the content of the received message) is further exposed (722). If the size of the icon 721 becomes the largest as an additional pinch-out touch input is applied, a screen 723 for writing a reply to the received message appears.

If the cumulative number of such touch gesture patterns reaches a predetermined value, a notification icon 730 of a larger size is displayed upon receiving a message from the same person (Tom) at a later time, as shown in the last part of FIG. 7B.

Alternatively, in some implementations, if a reply is written by applying a pinch-out touch input to the icon 721 that has ever been displayed, the priority level of the corresponding event may be immediately increased.

In some implementations, if the number of negative responses to the notification icon is more than the reference value, the controller 180 may decrease the priority level of the corresponding event. As such, the controller 180 may de-emphasize particular notification icons in which the user has not shown interest. Once the priority level of the event is decreased, the size of a notification icon displayed becomes smaller when the event occurs at a later time.

For example, referring to FIG. 7C, when a message with the intermediate priority level is received by a connected external terminal, an icon 741 indicating the receipt of a message in the second area B (of FIG. 2) is displayed on the display 151. When a preset touch gesture, for example, a pinch-in touch input, is applied to the displayed icon 741, the size of the icon 741 is reduced and displayed only in the smallest area A (of FIG. 2). Accordingly, the message content shown in the icon 741 disappears or only a part of it is displayed (S742). If the cumulative number of touch gesture patterns for reducing the icon to the smallest size reaches a predetermined value without replying to the received message, a notification icon 750 of a smaller size is displayed upon receiving a message from the same person (Jane) at a later time, as shown in the last part of FIG. 7C.

Figure 8A:
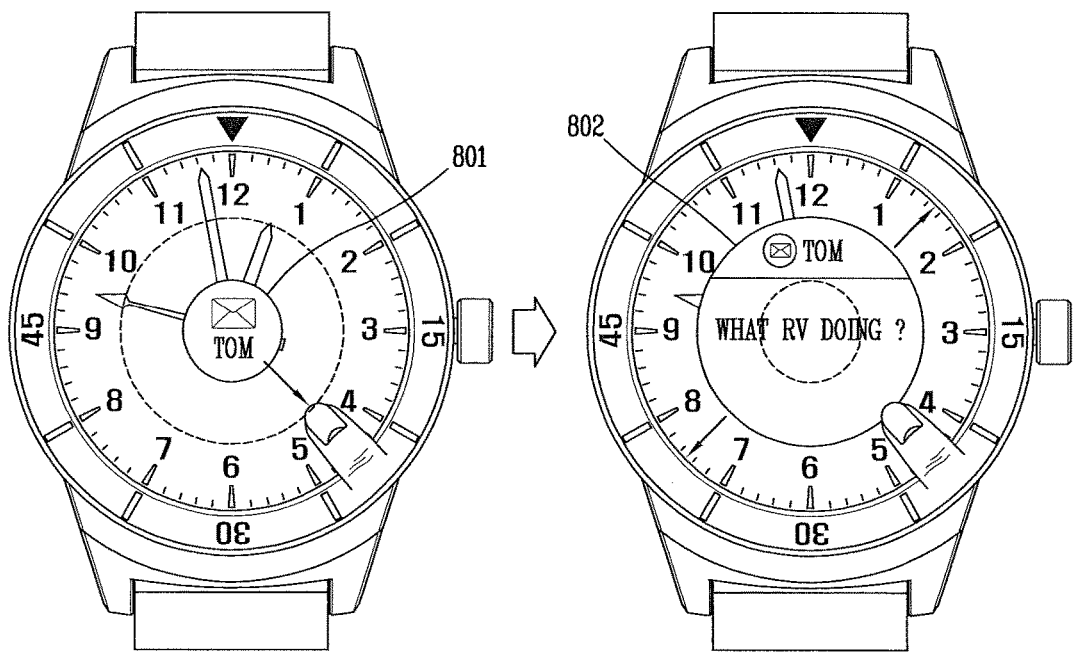
FIGS. 8A and 8B are diagrams illustrating an example of acknowledging event-related information in a notification icon, according to some implementations.
Figure 8B:
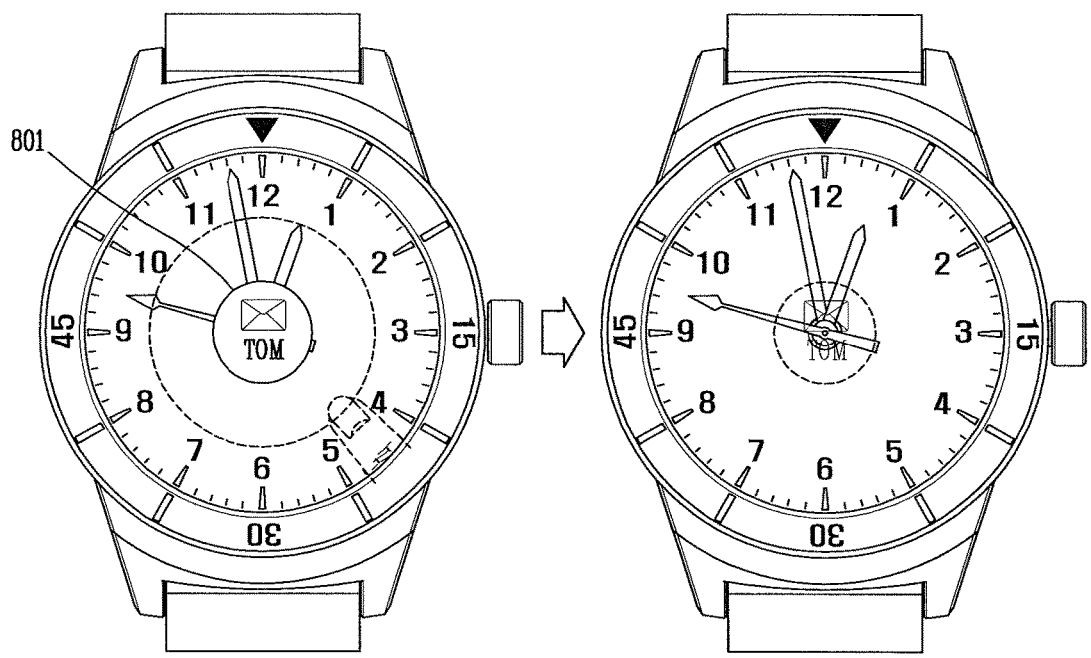

FIGS. 8A and 8B are diagrams illustrating an example of acknowledging event-related information in a notification icon When the controller 180 determines that an event occurs on the mobile terminal connected to the watch-type terminal 100, the controller 180 determines an appropriate size of a notification icon for the event based on a priority level for the event. The controller may determine an appropriate extent of exposure of the event-related information depending on the determined size of the notification icon. As such, an appropriate amount of information to display regarding an event may be adaptively determined based on the size of the notification icon.

When a notification icon is displayed on the display 151 and a preset touch gesture, e.g., a drag-type touch input or a pinch-in/pinch-out type of touch input, is applied to the displayed notification icon, the controller 180 may change the image of the displayed notification icon and control the event-related information displayed within the changed image. If the touch gesture applied to the notification icon ends within a particular reference time period, then the controller 180 may control the display of the notification icon so that the changed image of the notification icon goes back to the previous size.

As shown in FIG. 8A, while a notification icon 801 is being displayed in the smallest reference area A (of FIG. 2) of the display 151, if a touch input applied to the notification icon 801 is dragged in an outward direction from the first area A, then the controller 180 may display a larger notification icon 802 extending to the second area B (of FIG. 2) corresponding to the dragging length and direction.

In this case, as the size of the notification icon 801 is gradually expanded in four directions along the dragging path from the first area A to the second area B (of FIG. 2), other event-related information, e.g., the content of the message, gradually appears in the notification icon. With this gradual change in the image of the notification icon, at least part of the received message is shown in a preview. In this case, the controller 180 may display the received message in such an image format where the message is laid out along the dragging path.

With the received message being displayed, when the drag touch input ends, the controller 180 may change the display of the notification icon depending on the point where the drag touch input ends.

As an example, as long as the touch input ending point is in the second area B, out of the first area A, the notification icon 802 that is enlarged to encompass the second area B may continue to be displayed (FIG. 8A). In contrast, if the touch input ends within the first area A, the enlarged notification icon 802 may go back to the previous size (of notification icon 801) (FIG. 8B). In this case, the notification icon 802 may look as if it is shrinking like paper being rolled up, and only minimum information like sender information (Tom) may be displayed in the resized notification icon 802.

Once the image of the notification icon is enlarged and then goes back to the previous size, the controller 180 may deem the event corresponding to the notification icon as acknowledged.

Accordingly, any notification icon indicating the occurrence of an event or any status icon appearing at the upper end of the mobile terminal are no longer displayed on the watch-type terminal 100 and the mobile terminal connected to it. Afterwards, the display 151 may return to an inactive mode after the elapse of a predetermined time.

According to the foregoing example, even when a notification icon appears in the smallest size, event-related information may be immediately acknowledged without accessing an event-related application.

Figure 9A:
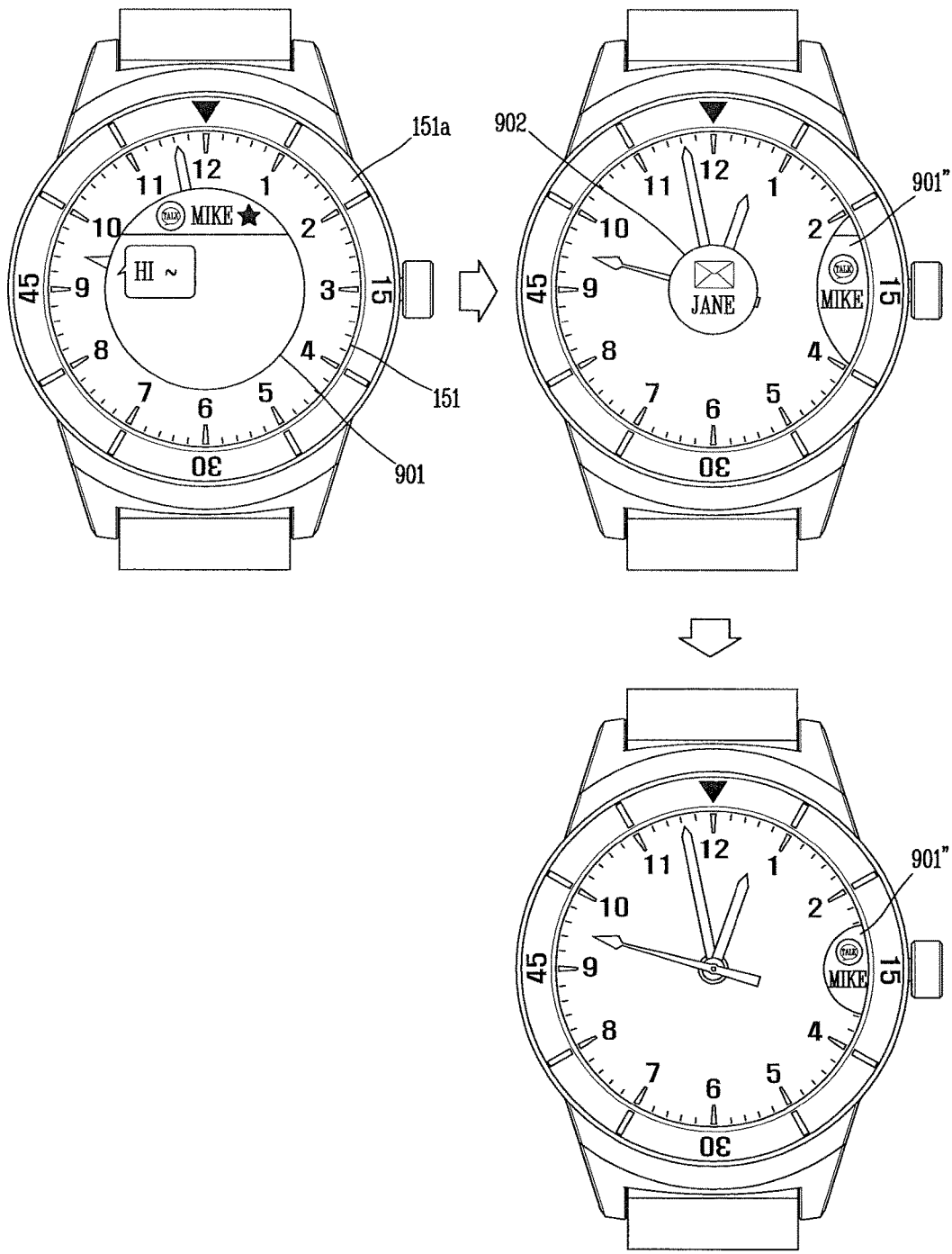
FIGS. 9A and 9B are diagrams illustrating an example of displaying notification icons when a plurality of events occur, according to some implementations.
Figure 9B:
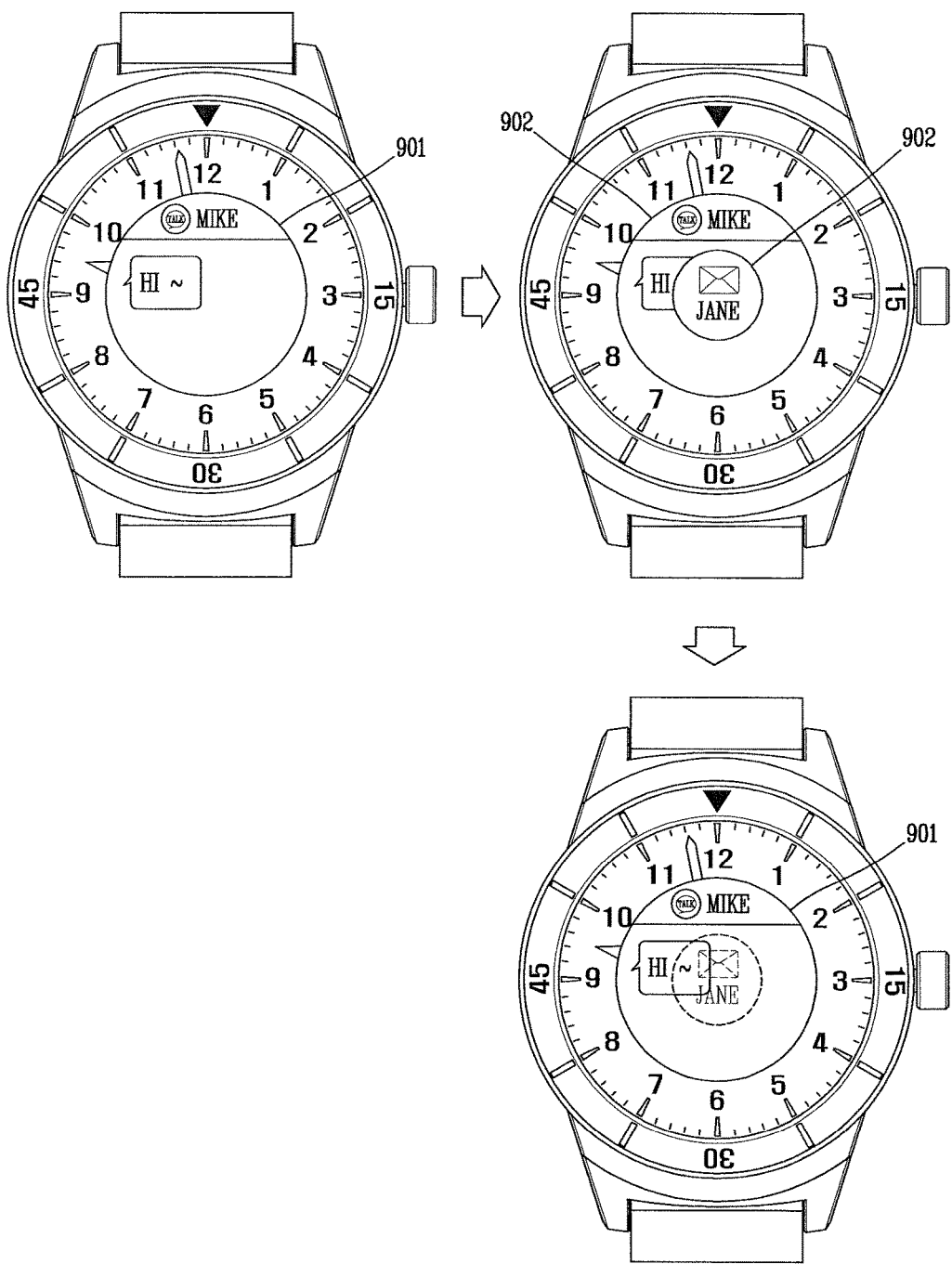

FIGS. 9A and 9B are diagrams illustrating an example of displaying notification icons when a plurality of events are received by the mobile terminal. In particular, FIGS. 9A and 9B illustrate an example of a method of displaying corresponding notification icons when a plurality of events have different priority levels.

First of all, referring to FIG. 9A, when a message with an intermediate priority level is received by the connected mobile terminal, a first notification icon 901 is displayed, on the display 151, with a size corresponding to the second area B (of FIG. 2). The first notification icon 901 displays an amount of event-related information (e.g., application type, message sender information, at least part of the message) that is appropriate for the size of the first notification icon 901.

Afterwards, if a message with a lower priority level is received by the mobile terminal before the first notification icon 901 is acknowledged by the user, then a second notification icon 902 with a size corresponding to the reference area A (of FIG. 2) may be displayed on the display 151. In this case, the controller may automatically move the unacknowledged first notification icon 901 to a specified region of the display 151, for example, the boundary of the display 151 adjacent to the bezel 151a and may display a corresponding image object 901" in that region. The image object 901" may include an image that generally corresponds to the first notification icon 901 but with a shape, color, length, or area that is changed according to the region to which it has been moved (e.g., changed from a circular image to a semi-circular image in FIG. 9A).

In the example of FIG. 9A, the region on the boundary of the display 151 where the image object 901" is displayed may correspond to a time of receipt of the message corresponding to the first notification icon 901. For example, if the message corresponding to the first notification icon 901 is received at 3:30 p.m., then the image object 901" may be displayed in a region of the display corresponding to 3:30 p.m., as shown in the example of FIG. 9A. As such, the display of the image object 901" may provide an easily-identifiable indication to the user of when the corresponding first notification icon 901 was received.

In some implementations, the image object 901" corresponding to the first notification icon 901 may continue to be displayed in the boundary of the display 151 even after the second notification icon 902 is acknowledged or after the second notification icon 902 disappears with the passage of a reference time.

Next, referring to FIG. 9B, if a message with a lower priority level is received by the mobile terminal while the first notification icon 901 is being displayed with a size corresponding to the second area B (of FIG. 2), then a second notification icon 902 with a size corresponding to the reference area A (of FIG. 2) may appear superimposed over the first notification icon 901. Accordingly, at least part of the first notification icon 901 may be hidden by the second notification icon 902. If the user applies a particular touch input to the display 151 (e.g., a drag-type touch input in a direction from to left-to-right), then the first notification icon 901 and the second notification icon 902 may be superimposed in reverse.

In some implementations, if the lower-priority second notification icon 902 remains superimposed over the higher-priority first notification icon 901, then the controller may eventually cause the lower-priority notification icon 902 to disappear from the display. For example, the controller may determine that the lower-priority second notification icon 902 has been superimposed over the higher-priority first notification icon 901 for a time period longer than a reference time, and may cause the lower-priority second notification icon 902 to disappear and only display the first notification icon 901, as shown in the last part of FIG. 9B.

In some implementations once a higher-priority notification icon is acknowledged by the user, the controller 180 may display a lower-priority notification icon either automatically or based on user input. For example, the controller may display a predetermined image (e.g., a change in the color of the edge, a predetermined object image) in the edge or bezel of the display 151, thereby informing the user of the unacknowledged lower-priority event.

If multiple notification icons are superimposed, as in FIG. 9B, then a user may access a desired application corresponding to one of the displayed notification icons 901 or 902 by first applying a particular type of touch gesture (e.g., a drag-type touch input) to move the desired notification icon to the front of the superposition, and then apply an additional touch input (e.g., long touch input or double-short touch input) to select the desired notification icon.

Figure 10:
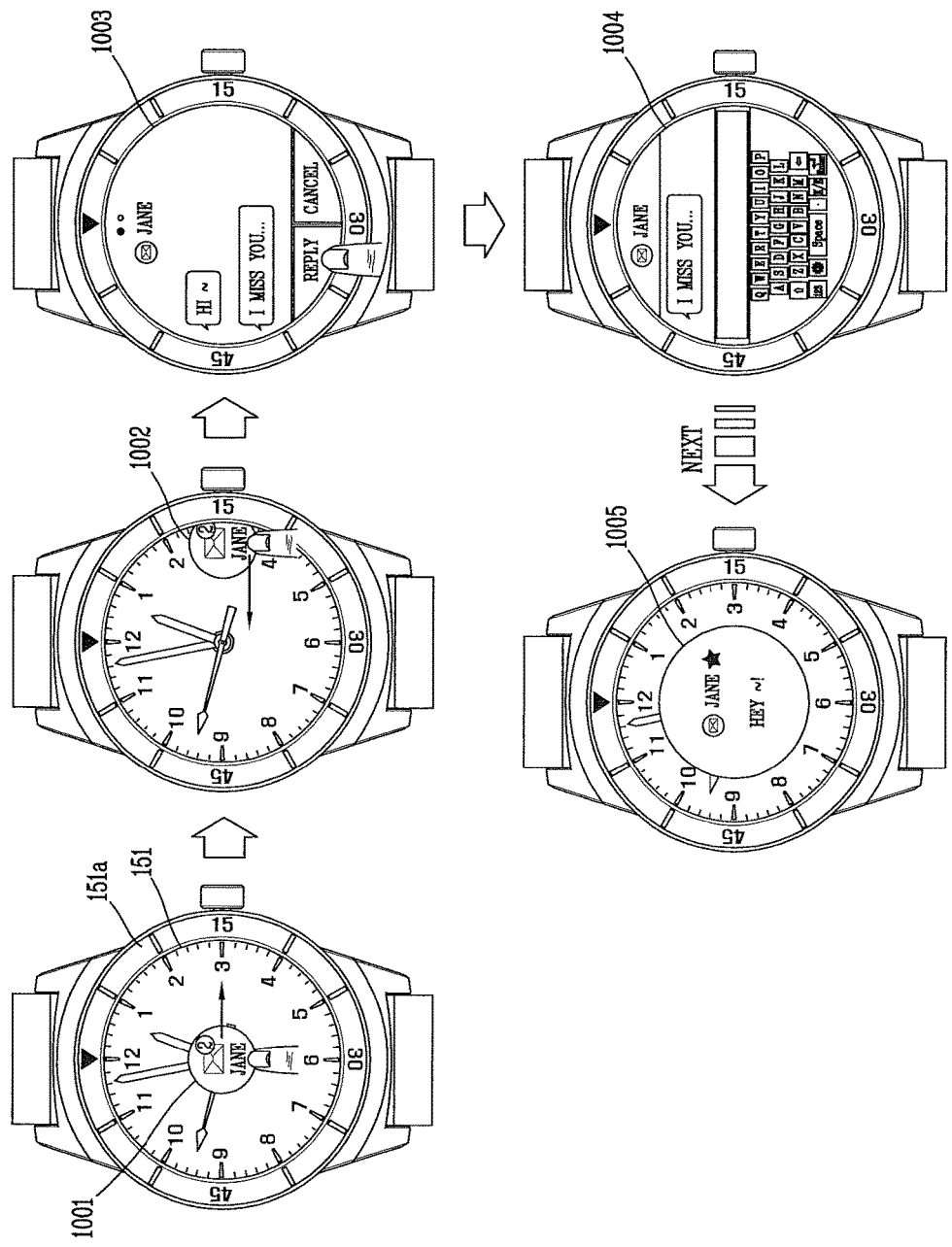
FIG. 10 is a diagram illustrating an example of acknowledging an event corresponding to a displayed notification icon later, according to some implementations.

FIG. 10 is a diagram illustrating an example of acknowledging an event corresponding to a displayed notification icon later.

In some implementations, a notification icon displayed on the display 151 may be reduced in size or made to disappear in reverse order of priority with the passage of a reference time. For example, notification icons corresponding to events with low priority levels may more be reduced in size than higher-priority notification ions. In some implementations, the controller 180 may, after reducing the size of a notification icon for an event, allow the user to subsequently check event-related information or write a reply to the event at a later time.

To this end, the controller 180 may enable a user to an event corresponding to a notification icon may be handled later by making a touch gesture on the bezel 151a surrounding the display 151 that is configured to sense touch input.

For example, when a drag touch input is applied in a direction toward the bezel 151a and away from the notification icon appearing on the display 151, the controller 180 may reduce the size of the notification icon to the smallest size and move it to where the drag touch input ends.

In the example shown in FIG. 10, if a notification icon 1001 indicating the receipt of a message is displayed in the smallest reference area A (of FIG. 2) of the display 151, the user may drag a touch input on the notification icon 1001 in a direction toward the bezel 151a so that the moved notification icon 1002 is displayed at the boundary of the display corresponding to the point where the touch input ends. The point where the notification icon 1002 is displayed corresponds to the point where the touch input ends. The notification icon 1002 may show various types of information, such as application type, number of events, and sender information as shown in FIG. 10, or may be replaced with another object (e.g., dot image) indicating that information (e.g., event occurrence) is saved at the point where the touch input ends to simplify the display on the display 151.

Next, when another drag touch input is applied in a toward the center of the display 151 away from the point where the initial drag touch input ended, the controller 180 may display the execution screen of the application corresponding to the moved notification icon. In this case, the moved notification icon may have an image effect as if gradually dragged along the dragging path.

For example, as shown in FIG. 10, when a touch input on the notification icon 1002 displayed in the boundary of the display is dragged toward the center of the display 151, the message application corresponding to the notification icon 1002 is executed and a chat window 1003 containing the received message appears in the display 151. When the 'reply' menu is chosen in the chat window 1003, the user may write a reply message using a pop-up virtual keyboard (1004). If such a response pattern is repeated a certain number of times (e.g., three times) or more, the priority level set for the corresponding event (e.g., reception of a message from Jane) goes up. Accordingly, when the next message arrives, a notification icon 1005 enlarged to compass the second area B appears on the display 151 and more information is shown in the notification icon 1005.

In some implementations, if an event occurring on the mobile terminal is set to a "secret mode," then the controller 180 may limit the extent of exposure of event-related information to the notification icon regardless of the size of the displayed notification icon.

The above examples also may be applicable to the size of a displayed execution screen if at least one application is executed on the watch-type terminal. For example, when executing music play on the watch-type terminal, the size of an execution screen displayed on the display 151 may be changed depending on the pattern of use such as whether the music currently being played is on favorites or how often the user has listened to this music.

Also, in some implementations, even if the size of the notification icon on the watch-type terminal is not changed depending on the priority level of an event, a notification of the same format (e.g., a notification icon of the same size or the same notification signal) may be displayed on the external terminal.

Implementations may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As explained above, a watch-type terminal and a method of controlling the same according to exemplary implementations provide a simple display and a customized notification by providing a notification distinguished from that of a mobile terminal depending on the priority of an event occurring on the mobile terminal. That is, the display of events of low priority is minimized, whereas the display of events of high priority contains event details as well, thereby providing user convenience. Moreover, the user can check the event details or easily change the priority of the event while keeping the current screen display.

The foregoing examples are merely exemplary and are not to be considered as limiting. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary implementations described herein may be combined in various ways to obtain additional and/or alternative exemplary implementations.

As the present features may be embodied in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A watch-type terminal comprising:
a display;
a wireless communication unit configured to receive information related to an event that occurs in an external terminal; and
at least one processor configured to:
  determine, based on the received information, a priority level of the event that occurs in the external terminal; and
  display, on a selected one of a plurality of regions of the display that successively increase in size relative to a center of the display, a notification icon regarding the event that occurs in the external terminal, wherein as the priority level of the event increases, the notification icon is displayed on a region among the plurality of regions with increasing size,
wherein the at least one processor is further configured to:
  receive location information of the external terminal based on the event occurring in the external terminal;
  based on the event being related to the received location information, increase the priority level of the event based on the received location information;
  change a size of the notification icon to be displayed, according to the increased priority level; and
  based on a change in the location information of the external terminal, decrease the increased priority level, and
wherein the at least one processor is further configured to:
  display a first notification icon and a second notification icon for notifying when first and second events occur, wherein the second event occurred after the first event;
  hide the first notification icon while the second notification icon is displayed, when the first event has a lower priority than a priority of the second event; and
  move the first notification icon to an area at a boundary of the display and adjacent to a bezel, when the first event has a higher priority than the priority of the second event,
  wherein the area where the first notification icon is moved to corresponds to a time at which the first event occurred.

2. The watch-type terminal of claim 1, wherein the at least one processor is configured to:
  select, based on the priority level of the event, a display region of the display; and
  display a notification icon of a size corresponding to the selected display region of the display.

3. The watch-type terminal of claim 1, wherein the at least one processor is configured to:
  determine a reference region occupying a reference display area of the display based on the priority level of the event;
  determine whether the priority level of the event meets a threshold level;
  based on a determination that the priority level of the event meets the threshold level:
    select a first display region of the display having a first display area that is larger than the reference display area by a first amount; and display a notification icon having a size corresponding to the selected first display region of the display; and based on a determination that the priority level of the event does not meet the threshold level:
- select a second display region of the display having a second display area that is smaller than the reference display area by a second amount; and
- display a notification icon having a size corresponding to the selected second display region of the display.

4. The watch-type terminal of claim 1, wherein the at least one processor is further configured to:
- select, based on a size of the notification icon to be displayed, at least a portion of the received information related to the event; and
- display, on the display of the watch-type terminal and in conjunction with the notification icon, the selected portion of the received information.

5. The watch-type terminal of claim 1, wherein the at least one processor is further configured to:
- determine, based on receiving the information related to the event, whether the display of the watch-type terminal is in an active mode; and
- based on a determination that the display is not in an active mode:
  - activate only a region of the display corresponding to a size of the notification icon to be displayed; and
  - display the notification icon in the activated region of the display.

6. The watch-type terminal of claim 1, wherein the at least one processor is further configured to:
- determine, based on the priority level of the event, a notification level that corresponds to the priority level; and
- output, along with displaying the notification icon, a notification signal having the determined notification level that corresponds to the priority level of the event.

7. The watch-type terminal of claim 1, wherein the at least one processor is configured to determine the priority level of the event that occurs in the external terminal by:
- determining at least one of sender information corresponding to the event, an application type corresponding to the event, or a user input corresponding to the event; and
- determining the priority level of the event based on the at least one of the sender information, the application type, or the user input.

8. The watch-type terminal of claim 7, wherein the at least one processor is further configured to:
- determine whether the priority level of the event meets a threshold level; and
- based on a determination that the priority level of the event meets the threshold level, continue displaying the notification icon until receiving an indication that a user acknowledges the notification icon.

9. The watch-type terminal of claim 7, wherein the at least one processor is further configured to:
- determine whether the priority level of the event meets a threshold level; and
- based on a determination that the priority level of the event meets the threshold level, display the notification icon with a size that initially covers an entire display region of the display and subsequently decreases over a period of time.

10. The watch-type terminal of claim 7, wherein the at least one processor is further configured to:
- determine whether the priority level of the event meets a threshold level; and
- based on a determination that the priority level of the event does not meet the threshold level, display the notification icon such that the notification icon disappears from the display or such that a location of the notification icon moves to a different region of the display.

11. The watch-type terminal of claim 1, wherein the at least one processor is further configured to:
- access, from at least one computer memory, a historical pattern of a user responding to the displayed notification icon;
- determine whether the historical pattern of the user responding to the displayed notification icon satisfies a first condition;
- determine whether the received information related to the event includes a first text pattern; and
- based on a determination that the historical pattern of the user responding to the displayed notification icon satisfies the first condition or that the received information related to the event includes the first text pattern, change the priority level of the event.

12. The watch-type terminal of claim 11, wherein the at least one processor is further configured to:
- determine that the historical pattern of the user responding to the notification icon comprises a number of times that the user has acknowledged the notification icon;
- determine whether the number of times that the user has acknowledged the notification icon meets a threshold number;
- based on a determination that the number of times that the user has acknowledged the notification icon meets the threshold number, increase the priority level of the event; and
- based on a determination that the number of times that the user has acknowledged the notification icon does not meet the threshold number, decrease the priority level of the event.

13. The watch-type terminal of claim 1, wherein the at least one processor is further configured to:
- determine whether a first touch gesture is applied to the notification icon; and
- based on a determination that the first touch gesture is applied to the notification icon, change the priority level of the corresponding event.

14. The watch-type terminal of claim 13, wherein the at least one processor is further configured to:
- based on changing the priority level of the event, display, for a predetermined amount of time, a notification message indicating the change in the priority level of the event.

15. The watch-type terminal of claim 1, wherein the at least one processor is further configured to:
- determine whether a user has applied a first touch gesture to the notification icon;
- based on a determination that the user has applied the first touch gesture to the notification icon, display the notification icon such that a size of the notification icon changes from a first size to a second size in a direction corresponding to the first touch gesture;
- determine whether a duration of the first touch gesture is less than a predetermined time period; and
- based on a determination that the duration of the first touch gesture is less than the predetermined time period, display the notification icon such that a size of the notification icon reverts back to the first size.

16. The watch-type terminal of claim 15, wherein the at least one processor is further configured to:

based on the determination that the duration of a second touch gesture is less than the predetermined time period, determine that the user has acknowledged the corresponding event.

17. The watch-type terminal of claim 1, wherein the at least one processor is further configured to:
- determine that the event that occurs in the external terminal corresponds to a message received by the external terminal;
- determine information regarding a sender of the message received by the external terminal;
- based on the information regarding the sender of the message, determine a priority level of the message;
  - adjust a size of the notification icon to be displayed based on the determined priority level of the message; and
- based on the adjusted size of the notification icon, determine at least a portion of the message to display with the notification icon having the adjusted size.

18. The watch-type terminal of claim 1, further comprising a bezel surrounding the display, wherein:
the display is configured to sense a touch input, and
the at least one processor is further configured to:
- determine whether a first drag-type touch input is applied on the display in a direction away from the notification icon and toward the bezel surrounding the display; and
- based on a determination that the first drag-type touch input is applied in the direction away from the notification icon and toward the bezel, reduce the size of the notification icon and change a display position of the notification icon to a location on the display where the first drag-type touch input terminates.

19. The watch-type terminal of claim 18, wherein the at least one processor is further configured to:
- determine whether a second drag-type touch input is applied on the display in a direction toward a center of the display and away from the location on the display where the first drag-type touch input terminates; and
- based on a determination that the second drag-type touch input is applied in the direction toward the center of the display and away from the location on the display where the first drag-type touch input terminates, display an execution screen of an application corresponding to the notification icon such that the execution screen moves on the display in accordance with the drag-type touch input.

* * * * *